(12) United States Patent
Wheeler

(10) Patent No.: US 9,141,590 B1
(45) Date of Patent: Sep. 22, 2015

(54) REMOTELY STORED BOOKMARKS EMBEDDED AS WEBPAGE CONTENT

(75) Inventor: Chris Wheeler, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/197,314

(22) Filed: Aug. 3, 2011

(51) Int. Cl.
*G06F 17/22* (2006.01)

(52) U.S. Cl.
CPC ............ *G06F 17/2241* (2013.01); *G06F 17/22* (2013.01)

(58) Field of Classification Search
USPC .................................. 715/205, 206, 208, 234
See application file for complete search history.

(56) References Cited

U.S. PATENT DOCUMENTS

| | | | |
|---|---|---|---|
| 6,219,679 B1 * | 4/2001 | Brisebois et al. ............. | 715/206 |
| 6,266,649 B1 * | 7/2001 | Linden et al. ................. | 705/7.29 |
| 6,275,862 B1 * | 8/2001 | Sharma et al. ................ | 709/245 |
| 6,493,702 B1 * | 12/2002 | Adar et al. ..................... | 707/706 |
| 6,546,393 B1 * | 4/2003 | Khan ................................... | 1/1 |
| 6,631,496 B1 * | 10/2003 | Li et al. ......................... | 715/200 |
| 6,769,019 B2 * | 7/2004 | Ferguson ...................... | 709/219 |
| 6,950,861 B1 * | 9/2005 | Amro et al. ................... | 709/219 |
| 7,031,961 B2 * | 4/2006 | Pitkow et al. ....................... | 1/1 |
| 7,747,749 B1 * | 6/2010 | Erikson et al. ................ | 709/226 |
| 8,266,157 B2 * | 9/2012 | Carmel et al. ................ | 707/749 |
| 8,396,759 B2 * | 3/2013 | Mehta et al. .................. | 705/26.7 |
| 8,583,658 B2 * | 11/2013 | Wilcox et al. ................. | 707/748 |
| 8,601,162 B1 * | 12/2013 | O'Shaughnessy ............ | 709/246 |
| 2001/0011285 A1 * | 8/2001 | Kanno et al. .................. | 707/512 |
| 2002/0116525 A1 * | 8/2002 | Peters et al. ................... | 709/242 |
| 2003/0131005 A1 * | 7/2003 | Berry .............................. | 707/10 |
| 2004/0267815 A1 * | 12/2004 | De Mes ....................... | 707/104.1 |
| 2006/0026523 A1 * | 2/2006 | Kitamaru et al. ............. | 715/708 |
| 2007/0067297 A1 * | 3/2007 | Kublickis .......................... | 707/9 |
| 2008/0109881 A1 * | 5/2008 | Dasdan .............................. | 726/4 |
| 2008/0275719 A1 * | 11/2008 | Davis et al. ........................ | 705/1 |
| 2008/0282198 A1 * | 11/2008 | Brooks et al. ................. | 715/854 |
| 2008/0301555 A1 * | 12/2008 | Vartiainen et al. ............ | 715/704 |
| 2010/0268704 A1 * | 10/2010 | Chou .............................. | 707/723 |
| 2011/0113100 A1 * | 5/2011 | Chawla .......................... | 709/205 |
| 2011/0307551 A1 * | 12/2011 | Danezis et al. ................ | 709/204 |
| 2012/0278127 A1 * | 11/2012 | Kirakosyan et al. .......... | 705/7.29 |
| 2013/0018960 A1 * | 1/2013 | Knysz et al. .................. | 709/204 |

OTHER PUBLICATIONS

"Miicrosoft Internet Explorer". Publishing Date: Jan. 19, 000.*
Shawn Callahan; How to use del.icio.us to foster collaboration; Nov. 20, 2006; Anecdote; pp. 1-3.*

(Continued)

*Primary Examiner* — Andrew Dyer
(74) *Attorney, Agent, or Firm* — Thomas Horstemeyer, LLP

(57) ABSTRACT

Bookmark services are provided in which user-selected bookmarks to favorite web pages are stored. In response to receiving a request for a web page from a particular user, the website operator may make a call to the bookmark service to obtain bookmarks that were previously selected by that user. The bookmark service forwards the bookmarks for the user to the website operator, and the website operator includes these bookmarks within the web page that is rendered to the user. Since the bookmarks are stored remotely at a bookmark service, the bookmarks may be available to the user regardless of the electronic device or web browser that is used to request a web page. The bookmarks that are rendered on the web page may also include recommended bookmarks to web pages that are deemed as possibly being of interest to a particular user.

20 Claims, 11 Drawing Sheets

(56) References Cited

OTHER PUBLICATIONS

Jason Bedell; How Social Bookmarking Works; Sep. 22, 2010; jasonbedell.com; pp. 1-5.*

Social Bookmarks; Sep. 14, 2008; webtools4u2use.com; pp. 1-4.*

Jason Schmidt; Diigo and Delicious; Jul. 30, 2010; Interactive Inquiry; pp. 1-11.*

"Social Bookmarking", downloaded Apr. 29, 2011 from http://en.wikipedia.org/wiki/Social_bookmarking, 5 pp.

"Amazon Social Bookmarking Sites ", downloaded Apr. 28, 2011 from http://websearch.about.com/od/bestwebsites/tp/freebookmarks.htm, 2 pp.

"Keeps Your Online Bookmarks Organized on a Single Page Dashboard", downloaded Apr. 28, 2011 from http://www.easybm.com/ , 2 pp.

"Bookmark Tracker," downloaded Apr. 28, 2011 from http://www.bookmarktracker.com.

"Save Every Web Site: Best Bookmarking Tools," downloaded Apr. 28, 2011, from http://reviewes.cnet.com/1990-9239_7-6646582-1.html , 3 pp.

"Web Page Bookmarks/Favorites," downloaded Apr. 28, 2011 from http://www.livinginternet.com/w/wu_surf_bkmk.htm , 3 pp.

"How to Bookmark a Webpage", downloaded Apr. 28, 2011 from http://www.ehow.com/how_5420_bookmark-web-page.html , 3 pp.

* cited by examiner

FIG. 11 is a block diagram of a system for providing a user with web pages that include user-selected bookmarks according to certain embodiments of the present disclosure.

REMOTELY STORED BOOKMARKS EMBEDDED AS WEBPAGE CONTENT

BACKGROUND

Web browser programs are computer software applications that are designed to retrieve web pages (and other information) over the Internet and render the retrieved information on a display device where it can be accessed and viewed by a user. A user may request a web page from a remote server over the Internet by inputting an address in the form of a Uniform Resource Locator ("URL") into the web browser program, which causes the web browser program to request one or more files from the remote server that are needed to construct the web page and render it on the user's display device. Upon receipt of the requested file(s), the web browser program renders the information (e.g., a web page, a form, a video, etc.) in an appropriate format on the user's display device, typically in the form of an XML or HTML document.

Each web page has a unique URL. As there are a very large number of web pages in existence, many URLs comprise extremely long sequences of characters which most users find burdensome or annoying to type into their web browser program. In order to relieve user's of this burden, it is common for a web browser program to include a list of "bookmarks." A bookmark may be selected to navigate to a web page without requiring the user to have any information about the web page's URL. User's often "bookmark" frequently visited web pages to avoid having to type in the URL of a web page each time the user wants to view the web page.

DETAILED DESCRIPTION

Figure 1:
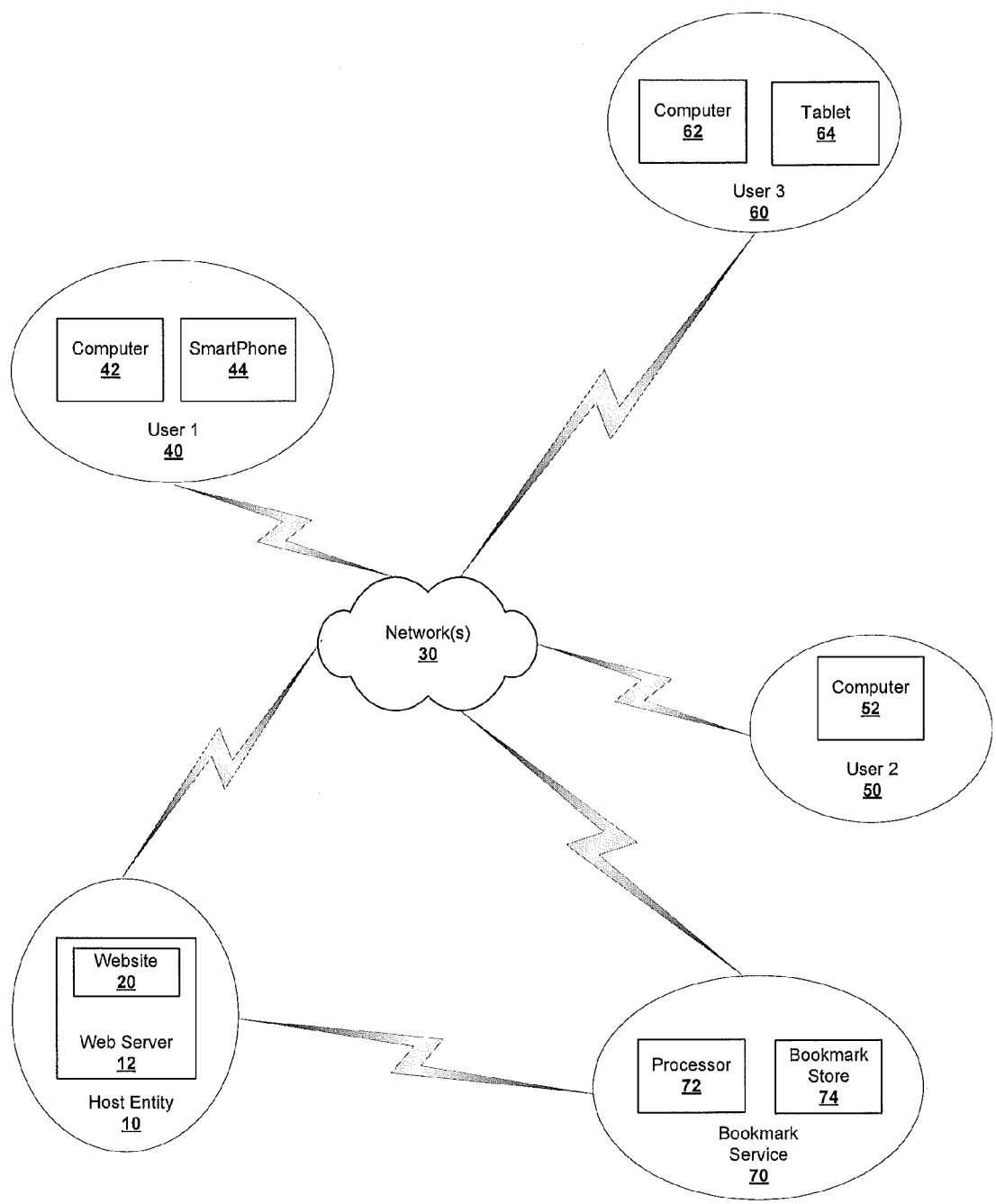
FIG. 1 is a schematic diagram illustrating a system according to embodiments of the present disclosure that may be used to provide user-selected bookmarks as part of a web page.

Pursuant to embodiments of the present disclosure, a bookmark service is provided in which user-selected bookmarks are stored. Each user-selected bookmark may comprise, for example, a hyperlink to a web page that the user has previously identified as a "favorite" web page. The bookmark service may operate as follows. In response to receiving a request for a web page from an electronic device, the web server that hosts the requested web page may make a call to the bookmark service to obtain bookmarks that were previously selected by a user associated with the electronic device. In response to this call, the bookmark service forwards the bookmarks to the web server. The web server incorporates the received bookmarks into the files that are forwarded to the user's web browser program in response to the request for the web page. These files are configured so that when the requested web page is rendered on a display device, the user's bookmarks are displayed to the user as part of the web page, or an element such as a pull-down menu or a pop-up window is provided on the web page that the user can interact with in order to view and/or access these bookmarks. Thus, each time a user visits a web page of a website that uses the bookmark service, the web server that hosts the website may request the bookmarks for that user (if any exist) from the bookmark service and may display those bookmarks (or otherwise make those bookmarks accessible to the user) as part of the web page that is provided and displayed to the user. Herein, the above-described user-selected bookmarks that are rendered within a web page are sometimes referred to as "server-stored bookmarks" to distinguish these bookmarks from conventional bookmarks that are stored and maintained by a web browser program.

In some embodiments, the bookmark service may organize the bookmarks that are stored for each user by website. When a particular website makes a call to the bookmark service, the bookmark service may only provide the bookmarks of the user for web pages that are within the website at issue in response to the call so that these server-stored bookmarks may be displayed as part of the web page requested by the user. In these embodiments, the user can navigate between web pages of a website using the server-stored bookmarks. As such, the user need not clutter the conventional bookmark list stored by the user's web browser program with bookmarks for multiple web pages from the website. In other embodiments, the bookmark service may provide bookmarks to one or more web pages that are not affiliated with the current web page being rendered for display to the user. In either case, the above-described bookmark service allows a user's bookmarks to "follow" the user regardless of the electronic device or web browser that is used to request and display a web page, as the user's bookmarks are centrally stored with a bookmark service as opposed to being stored locally within a particular electronic device or web browser program.

The bookmark service and/or the web server(s) that use the bookmark service may recommend additional bookmarks to a user based on various criteria. The bookmark service or web server(s) may also store metadata associated with each bookmark that can be viewed by, for example, simply mousing-over the bookmark. This metadata may provide a summary of the web page associated with the particular bookmark without having to actually navigate to the web page. The bookmark service or web server(s) may also manage the user's bookmarks. For example, the bookmark service or web server (s) may update a bookmark when the URL for the web page associated with the bookmark is modified. By updating the bookmark, a user will not receive an error message such as a 404 error indicating that the requested web page could not be found in response to selecting the bookmark. Thus, the bookmark service may provide enhanced functionality as compared to conventional bookmarks stored locally in a web browser.

Embodiments of the present disclosure will now be discussed with respect to the accompanying drawings, which illustrate example embodiments for purposes of illustration.

FIG. 1 is a schematic diagram illustrating a system according to embodiments of the present disclosure that may be used to deliver user-selected bookmarks as part of the content of a delivered web page. As shown in FIG. 1, a host entity 10 operates one or more web servers 12 which host a website 20. A plurality of users 40, 50, 60 access web pages of the website 20 over one or more networks 30 (e.g., Internet, Intranet, etc.) via one or more electronic devices 42, 44, 52, 62, 64 (e.g., laptop computer, desktop computer, tablet, smartphone, electronic book reader, game console, etc.). The host entity 10 interfaces with a bookmark service 70 that stores and manages user-selected bookmarks and, upon request, provides those bookmarks to the web server 12 operated by the host entity 10.

As shown in FIG. 1, the website 20 is maintained by the host entity 10, and the host entity 10 updates the website 20 as necessary and controls the content thereof. The electronic devices 42, 44, 52, 62, 64 associated with users 40, 50, 60 may forward requests to the web server 12 over the network(s) 30 for web pages of the website 20 in known fashion. When the web server 12 receives such a request for a web page from, for example, electronic device 44, the web server 12 may determine if the electronic device 44 is associated with a known user based on, for example, user login information that was provided by the electronic device 44 with the request or identifying information that was forwarded with the request by a cookie resident on the electronic device 44. If the electronic device 44 is associated with a known user (here user 40), the host entity 10 may request bookmarks associated with user 40 from the bookmark service. These bookmarks may be stored in a bookmark store 74 that is maintained by the bookmark service 70. A processor 72 (e.g., a server) at the bookmark service 70 processes the request and provides the user-selected bookmarks for user 40 to the web server 12, and may also provide other bookmarks such as recommended bookmarks, sponsored bookmarks or the like, as is discussed in more detail below. The host entity 10 may then deliver the requested web page to the electronic device 44, where the content of the web page includes a "quick access menu" that has the bookmarks provided by the bookmark service 70.

In some embodiments, the bookmark service 70 may be an entity that is independent of the host entity 10. By way of example, in one such embodiment, the bookmark service 70 may store user-selected bookmarks for a wide variety of users such as users 40, 50, 60. This bookmark service 70 may provide user-selected bookmarks to website operators such as host entity 10 upon request. In this particular embodiment, the bookmark service 70 may act as a service provider to a large number of website operators. In such embodiments, when a user that has user-selected bookmarks stored at the bookmark service 70 requests a web page from any of the website operators that contract with the bookmark service 70 (e.g., host entity 10 in FIG. 1), the website operator receiving the request may obtain the bookmarks for that user from the bookmark service 70, and then include those bookmarks as part of the content of the web page delivered to the requesting user. Since each user's bookmarks are stored at a central bookmark service 70, the bookmarks will be available to the user regardless of the electronic device or web browser that is used to request a web page from any of the website operators that use the bookmark service 70. In some embodiments, the bookmark service 70 provides only bookmarks associated with the website operator and related websites. In other embodiments, the bookmark service 70 may also provide bookmarks associated with website operators that are not associated with the currently viewed web page and the like. Additionally, as discussed below, the bookmark service 70 may also generate and provide recommended or suggested bookmarks that may or may not be affiliated with the website operator.

In other embodiments, the bookmark service 70 may be operated by or otherwise associated with the host entity 10. In such embodiments, the bookmark service 70 may, for example, exclusively or primarily populate the quick access menu that is delivered as part of each requested web page with user-selected bookmarks for web pages that are associated with website 20 (or that are web pages of a group of websites that are operated by the host entity 10). In this case, the user-selected bookmarks may act as a website-specific set of bookmarks that allow a user to quickly and easily navigate to favorite pages within the website 20. As numerous different websites may employ this functionality, a user may specify "sub-directories" of bookmarks for each of these websites and then have the appropriate sub-directory appear on each web page that the user requests from the websites that implement this bookmarking functionality. Some entities that host websites may prefer this approach since the user-selected bookmarks that are provided to a user that requests a web page from their website may be exclusively or primarily associated with other web pages of the website, and hence few if any bookmarks may be provided that allow a user to easily navigate to a different website.

In still other embodiments, the functionality of the above embodiments may be combined. By way of example, a website operator may deliver web pages to users that include functionality that would allow each user to bookmark "favorite" web pages on the website. The website operator would store each bookmark selected by a particular user in a data store and include the stored bookmarks on each web page that it delivers to the user to allow that user to quickly navigate to favorite pages within the website. However, in many instances, a particular user may only have selected a small number of favorite web pages within the website at issue. Accordingly, the website operator may also request site specific bookmarks from bookmark service 70 to see if a particular user has bookmarks to any additional web pages (which may or may not be bookmarks to web pages within the website run by the operator) stored at the bookmark service 70, which would then be returned to the website operator. The website operator could add some or all of the user-selected bookmarks that are returned by the bookmark service 70 on each web page that the website operator delivers to the user in order to provide a more comprehensive list of bookmarks to the user. In still other embodiments, the website operator may additionally or alternatively make a call to the independent bookmark service 70 to obtain "recommended" bookmarks (as opposed to user-selected bookmarks) from the bookmark service 70 in the manner described herein and display these recommended bookmarks on each web page that is delivered to the user.

As is discussed in more detail herein, the bookmark service 70 and/or the host entity 10 may also use stored information about a particular user to manage how the user-selected bookmarks are presented to the user on a requested web page and/or to present additional bookmarks to the user that may, for example, be of interest to that particular user. Examples of the type of stored information that may be used include a user's browsing history on one or more websites, the user's purchase history over one or more websites, known demographic characteristics of the user, etc. Examples of how user-selected bookmarks may be managed and how additional non-user selected bookmarks may be presented to a particular user are provided below.

Figure 2:
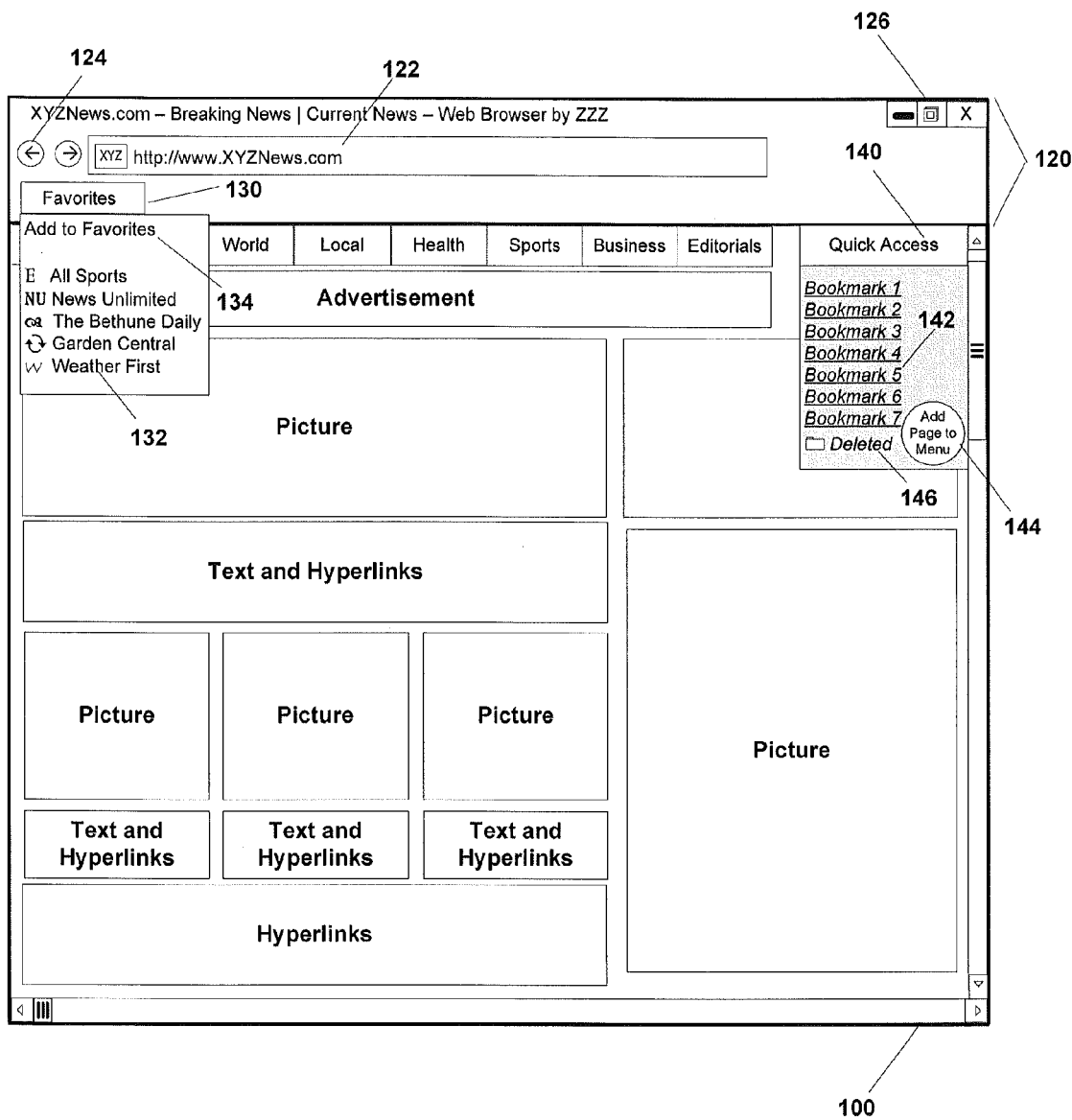
FIG. 2 is a schematic diagram illustrating a web page that includes a quick access menu having user-selected bookmarks thereon according to embodiments of the present disclosure.

FIG. 2 is a schematic diagram illustrating a web page 100 that includes a quick access menu having user-selected bookmarks according to certain embodiments of the present disclosure. As shown in FIG. 2, the web page 100 may include a plurality of different areas, sections, frames and/or windows that include different types of content. A web browser control section 120 may also be displayed to the user. The web browser control section 120 may include a variety of controls that a user may use to navigate between different web pages such as, for example, a URL input box 122 that a user may type a URL into in order to instruct the web browser program to retrieve and display a specific web page, as well as forward and back buttons 124 that may be used to navigate between recently-viewed web pages. The web browser control section 120 may also include various control buttons 126 such as buttons that may be used to minimize, resize and close a web browser window that the web page 100 is rendered within.

The web browser control section 120 further includes a conventional pull-down "Favorites" menu 130 that, when selected or otherwise "opened," displays bookmarks 132 and an "Add to Favorites" widget 134 (the menu 130 is shown in its "open" position in FIG. 2). A user may select one of the bookmarks 132 to navigate to the web page associated therewith and/or may use the widget 134 to add a bookmark 132 to the currently-viewed web page to the pull-down menu 130. Operation of these conventional web browser features are known in the relevant art and therefore do not require further description herein. The bookmarks 132 may be stored locally by the web browser program on, for example, the electronic device that displays the web page 100.

As is further shown in FIG. 2, a quick access menu 140 is rendered within the web page 100. In the depicted embodiment, the quick access menu 140 is implemented as a pull-down menu that, when interacted with, displays a plurality of bookmarks 142 (the menu 140 is also shown in its "open" position in FIG. 2). The menu 140 further includes a widget 144 in the form of a button that is labeled "Add Page to Menu." A user may select the widget 144 to add a bookmark 142 for the currently displayed web page 100 to the quick access menu 140.

The bookmarks 142 that are displayed on the menu 140 differ from the bookmarks 132 that are stored locally by a web browser in that the bookmarks 142 on menu 140 are stored remotely from the client device (e.g., at bookmark service 70), and the menu 140 is rendered as part of the web page 100. The bookmarks 142 that are displayed in the menu 140 may all be for web pages that are associated with a single website or may be for associated with web pages associated with multiple websites (regardless of whether the websites are associated with a single entity or not). Each time a user (via an electronic device) requests a web page from a bookmark service enabled website, the web server 12 that hosts the website 20 may obtain any of the user's bookmarks from the bookmark service 70 and then deliver a web page that has a quick access menu 140 that includes any or all of these bookmarks to a web browser program running on the user's electronic device. In some embodiments, the menu 140 may appear in the same location on each web page. In other embodiments, the location where the menu 140 appears within a web page may vary from web page to web page and/or be customizable by the user.

A user viewing a webpage that includes the quick access menu 140 may use a pointing device to "open" the pull down menu 140 and to select one of the bookmarks 142 in a conventional fashion in order to request the web page associated with the selected bookmark 142. A user may similarly select the "Add Page to Menu" widget 144 that is displayed on the pull-down menu 140 (e.g., using a pointing device) to cause the web browser program to instruct the bookmark service 70 (perhaps via the web server 12) to add a bookmark to the currently displayed web page 100 for that particular user. Mechanisms may also be provided to allow a user to delete selected ones of their bookmarks 142 that are stored by the bookmark service 70. For example, in some embodiments, each bookmark displayed to a user on a web page could have an associated "Delete Bookmark" function that, when activated by the user, removes the bookmark 142 from the user's bookmark library at the bookmark service 70. In other embodiments, a user may view their bookmark library at the bookmark service in order to add, delete, reorder or otherwise manage their bookmarks.

As noted above, in some embodiments, the bookmarks 142 that are displayed in the menu 140 of FIG. 2 may all be associated with web pages that are associated with a single website (or one or more websites hosted by the same entity). In such embodiments, the menu 140 provides an entity-specific set of bookmarks 142 that may allow a user to quickly and easily access various web pages within, for example, a specific website. As such, in some embodiments, the menu 140 may operate as a subdirectory of web pages contained within a particular website that will be displayed or otherwise made accessible to a user each time the user views a web page within the website at issue. As is discussed in more detail below, the website operator may also include on the menu 140 "suggested" or "recommended" bookmarks to, for example, most recently-viewed web pages, most popular web pages and/or other web pages that may be of particular interest to a particular user.

Additionally, the bookmarks 142 included on menu 140 may be stored at a bookmark data store 74 that is remote from the client device. As such, the bookmarks 142 may appear every time the user views the web page 100 regardless of the electronic device that is displaying (or web browser program rendering) the web page 100. This is in contrast to conventional bookmarks 132, which are stored locally on the client device and must be created (or imported) separately on each electronic device (e.g., desktop computer, laptop computer, tablet, electronic book reader, smartphone, etc.) in order to be accessible to the user. Additionally, since the bookmark service 70 maintains the bookmarks 142, the bookmark service 70 (or, alternatively, the web server 12) can manage each user's bookmarks 142 as appropriate. For example, if the URL that is associated with a web page of a particular website changes, the web server that hosts the website can notify the bookmark service 70 and the bookmark service 70 may replace or update the currently-stored URL associated with the web page the new URL for the web page. This operation may be seamless to the user. Likewise, in some embodiments, if a web page that a user has previously bookmarked is deleted, the web server that hosts the web page can notify the bookmark service 70 to, for example, move the bookmark 142 for that deleted web page to a deleted bookmark folder 146 so that the user will not later try to select the bookmark 142 to request a web page that no longer exists.

The bookmark service 70 (or the web server 12 that renders the bookmarks 142 in the web page 100) may dynamically manage how the bookmarks 142 are displayed for one or more of a variety of reasons. For example, in some embodiments, the bookmark service 70 (or the web server 12) may rank order the bookmarks 142 based on how often the user selects the bookmarks 142. Thus, the bookmarks 142 may be displayed to the user, for example, with the most frequently selected bookmarks 142 at the top of the menu 140. In other embodiments, the bookmarks 142 may be ordered based on how recently the user selected the bookmarks 142. In still other embodiments, the bookmark service 12 (or the web server 12) may utilize a user's browsing history (including web pages not associated with a bookmark 142) to determine which bookmarks 142 may be most relevant to the user and order the bookmarks 142 accordingly. The bookmarks 142 could alternatively be ordered based on the popularity of the associated web pages with other users. In still other embodiments, combinations of two or more of the above listed factors may be used to order the bookmarks 142. It will be appreciated that other considerations may also be used to order the bookmarks 142.

The web server 12 that hosts the website 20 may use one or more of various mechanisms to identify each user so that the bookmarks 142 for that user may be obtained from the bookmark service 70 and rendered in each web page requested by the user. For example, in some embodiments, each user may be required to log into the website 12 using, for example, a user name and a password. Many commercial websites that advertise and sell goods and services already require users to log into the website using, for example, an identifier and password, and this login information may be used to identify the user each time the user accesses the website. If a user is identified, the web server will make a call to the bookmark service 70 to obtain some or all of the bookmarks 142 for that user and then render that user's bookmarks 142 in each web page that is provided to the user. It will also be appreciated that other mechanisms may be used to identify the user. For example, in some embodiments, the web server 12 may install a cookie with a unique identifier in the memory of the electronic device(s) that are used by a particular user to access the website 20. Each time the user requests a web page from the web server 12, the cookie will insert the unique identifier into the request, and the web server 12 can use this identifier to determine that the request for the web page came from a particular user (or electronic device). It will be appreciated that other techniques may likewise be used by a web server to identify a user. It will also be appreciated that some identification techniques will identify a specific user (i.e., when user login information is collected), while others may identify a specific electronic device (i.e., when the identification is made based on information returned from a cookie installed on the electronic device). In each case, this identification is considered to be an identification of the user, as the bookmarks for this "user" are stored at the bookmark service 70 based on the provided identification information.

It will also be appreciated that the web servers that utilize a particular bookmark service 70 typically will provide user identification information to the bookmark service 70 each time they request bookmarks for a particular user. In some embodiments, the bookmark service 70 may request that the web servers use standardized identifiers such as e-mail addresses or other unique identifiers to identify the users so that the bookmark service 70 will be able to identify a particular user regardless of which web server sends a request to the bookmark service 70 for the bookmarks for that particular user. If non-unique identifiers are used, a single user may end up with multiple sets of user-selected bookmarks in the bookmark store 74 of the bookmark service 70 due to different web servers identifying the user to the bookmark service 70 with different identification information.

FIGS. 3-9 illustrate additional features that may be included in example quick access menus according to further embodiments of the present disclosure. Each of the quick access menus illustrated in FIGS. 3-5 and 7-9 could replace the quick access menu 140 illustrated in FIG. 2.

Figure 3:
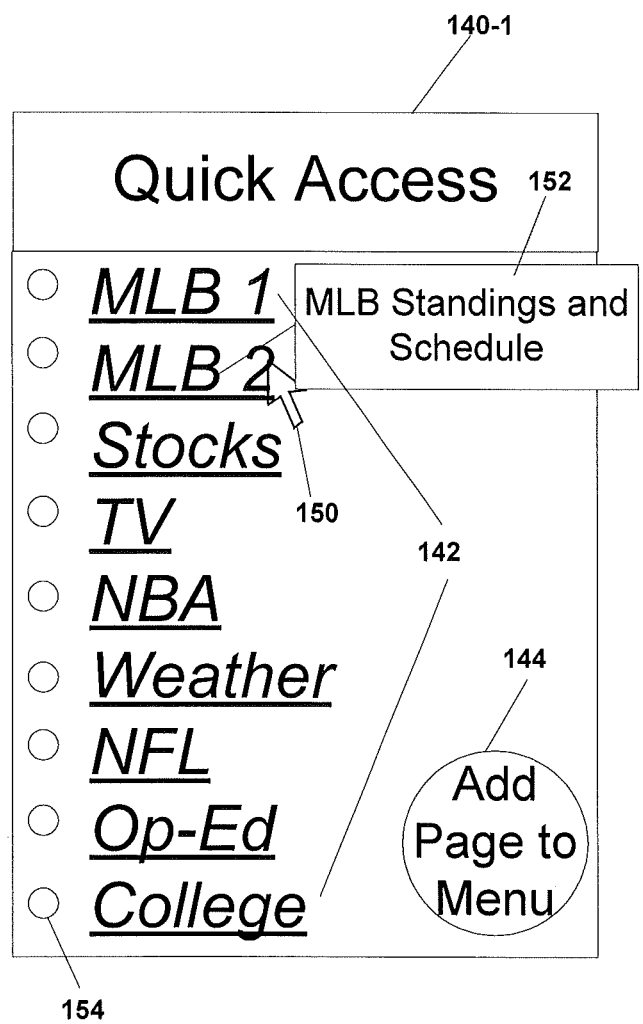
FIG. 3 is a schematic diagram of a quick access menu according to certain embodiments of the present disclosure that illustrates how bookmarks included in the menu may have associated metadata.

For example, FIG. 3 illustrates a quick access menu 140-1 that illustrates how, according to some embodiments, information (which will be referred to herein as "metadata") regarding a web page associated with a particular one of the bookmarks 142 may be provided to a user. In the embodiment shown in FIG. 3, this information is presented to the user in response to detection of a mouse-over event associated with the bookmark 142 at issue. As shown in FIG. 3, when an arrow 150 that is controlled by a pointing device (not shown) is moved adjacent and/or on top of the MLB2 bookmark 142, a dialog box 152 appears providing information regarding the web page associated with the MLB2 bookmark 142 such as, for example, a summary of the type of information available on the web page associated with the MLB2 bookmark 142.

Any appropriate metadata may be displayed in response to the mouse-over. It will also be appreciated that any of a wide variety of techniques may be used to trigger display of the metadata. By way of example, user selectable buttons (or other selection features) 154 may be provided adjacent each bookmark 142 instead of, or in addition to, the mouse-over capability. If the user selects the button 154, an associated widget is activated that causes display of the dialog box 152 adjacent the corresponding bookmark 142. It will also be appreciated that a wide variety of different metadata may be displayed in the dialog box 152 (or other display feature). For example, the metadata provided for a web page of an online retailer or service provider could include a thumbnail image of the web page, a description and/or price of one or more featured items and the like. Other information could also be provided (e.g., a product rating).

In some embodiments, the metadata may be selected by the bookmark service 70, and may be delivered to a requesting web server 12 along with the user's bookmarks 142 in response to a call for that user's bookmarks 142. In other embodiments, the metadata may be selected by the web server 12 that hosts the web page at issue, and then provided to the bookmark service 70. In still other embodiments, the web server 12 that delivers the web page to the user may select the metadata for some or all of the bookmarks 142 for a particular user that are returned in response to a call to the bookmark service 70. The metadata associated with a particular web page may be the same for all users or, alternatively, may be customized for each user based on, for example, the prior purchasing history of the user or known demographic characteristics of the user or any other appropriate criteria.

In some embodiments, the user's web browser program retrieves the metadata from the web server 12 (or elsewhere) in response to a mouse-over, activation of the user-selectable button 154 or other activation mechanism. In other embodiments, the metadata that is associated with the bookmarks 142 may be sent to the user's web browser as part of the file(s) that are sent in response to the user's request for the web page 100, and hence may be available to be immediately displayed to the user.

Figure 4:
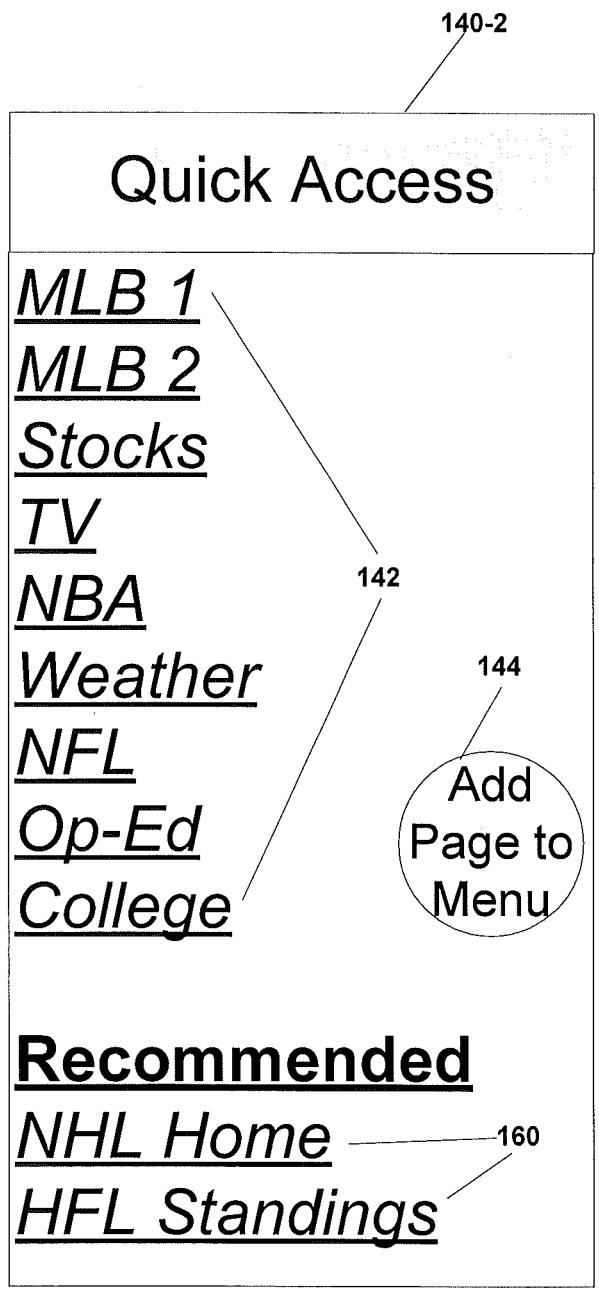
FIG. 4 is a schematic diagram of a quick access menu according to certain embodiments of the present disclosure that includes recommended web pages.

Pursuant to further embodiments of the present disclosure, the bookmark service 70 may also provide recommended bookmarks in addition to the user-selected bookmarks to a website operator or other entity. An illustrative example of such an embodiment is depicted in FIG. 4. In the example of FIG. 4 a quick access menu 140-2 is depicted that includes bookmarks 142 that were selected by a particular user. The quick access menu 140-2 is included as part of the content of each web page that is delivered and displayed to the user, and the user may select one of the bookmarks 142 to navigate to selected web pages. As is also shown in FIG. 4, the bookmark service 70 (or, alternatively, the web server 12) may provide recommendations for additional web pages that the user may want to visit by including bookmarks 142 to these additional web pages on the user's quick access menu 140-2. In the example of FIG. 4, the bookmark service 70 provides the recommended bookmarks 160 to a website operator and the website operator then includes these recommended bookmarks 160 in a "Recommended" section or area of the quick access menu 140-2 on the web page that is rendered to the user.

The bookmark service 70 (or web server 12) may select the web pages that have corresponding "recommended" bookmarks 160 displayed on the quick access menu 140-2 in a variety of ways. In some embodiments, the recommended bookmarks 160 may be selected at least in part based on the browsing history of the user (e.g., the browsing history of the user in general or the browsing history of the user on the website that includes the currently-displayed web page). For example, in some embodiments the recommended bookmarks 160 may comprise bookmarks to frequently visited web pages that the user did not manually select for inclusion on the quick access menu 140. These frequently visited web pages may be identified from a browsing history for the user that may be stored by the bookmark service 70 and/or web server 12. In other embodiments, the "recommended" bookmarks 160 may be determined based on the viewing preferences and/or bookmarks 142 of other users (e.g., most popular bookmarks, bookmarks of "similar" users, etc.). For example, the recommended bookmarks 160 may comprise bookmarks that are included in the quick access menus 140 of other users who have bookmarks 142 that are highly correlated with (e.g., a minimum number or percentage of the bookmarks 142 of the two users are the same) with the bookmarks 142 selected by the user at issue. In still further embodiments, the recommended bookmarks 160 may be selected based on demographic characteristics of the user. Combinations of the above and/or other methods may also be used. Other factors such as a user's purchasing history, browsing history and/or review history (e.g., the ratings that the user has provided in reviews of purchased products) may be considered in determining the recommended bookmarks 160.

In some embodiments, the bookmark service 70 may collect and store information regarding each user's browsing history, purchase history, demographic characteristics and the like which may be used in certain embodiments to recommend, order and otherwise manage the bookmarks for the users of the bookmark service. In other embodiments, this information may be collected and stored by each web server 12 that uses the bookmark service 70, and the bookmark management functions may be performed by the individual web servers 12. In still other embodiments, an independent service may be provided that collects this information and provides it to either or both the bookmark service 70 and/or the web servers 12 for use in managing the bookmarks of the users.

Figure 5:
FIG. 5 is a schematic diagram of a quick access menu according to certain embodiments of the present disclosure that further includes bookmarks to recently visited web pages and bookmarks to highly ranked web pages.

FIG. 5 illustrates additional information that may be included in quick access menus according to embodiments of the present disclosure. In particular, FIG. 5 illustrates a quick access menu 140-3 that again is implemented using a pull-down menu. As shown in FIG. 5, the quick access menu 140-3 includes a plurality of bookmarks 142 that were selected by the user, along with the above-described recommended bookmarks 160. Additionally, the quick access menu 140-3 further includes bookmarks 162 to recently-viewed web pages and bookmarks 164 to highly ranked web pages. A highly ranked web page may comprise, by way of example only, a web page that is requested by the largest number of users or a web page that the most users have bookmarked. In some embodiments, the highly ranked web pages may be highly ranked web pages for a particular website (which may be, for example, the website that includes the web page that the user is currently viewing), while in other embodiments the highly ranked web pages may be web pages from any website.

Figure 6:
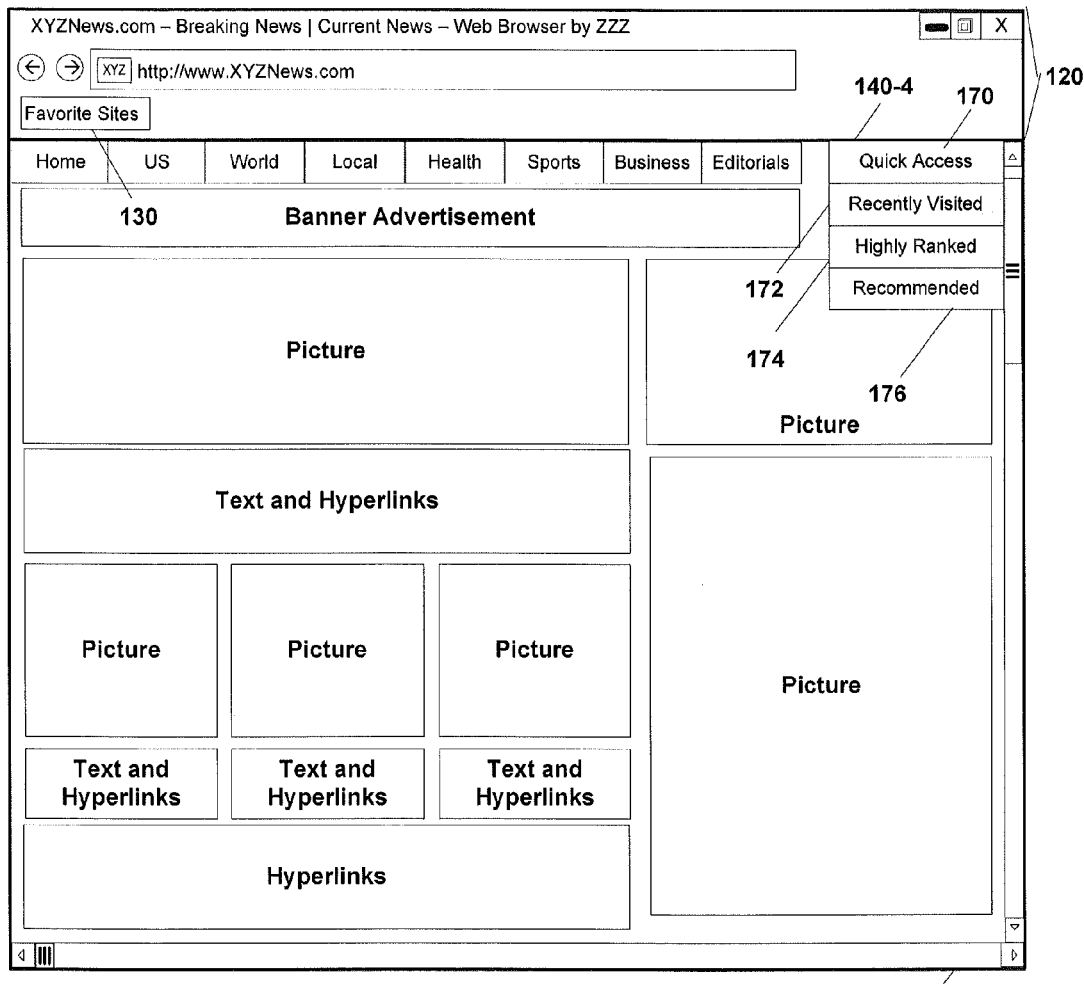
FIG. 6 is a schematic diagram illustrating a web page that includes separate menus for different types of bookmarks according to certain embodiments of the present disclosure.

While FIG. 5 illustrates a quick access menu 140-3 in which all of the bookmarks 142, 160, 162, 164 are contained on a single quick access menu 140-3, it will be appreciated that the technology described herein is not limited to such embodiments. For example, FIG. 6 illustrates a quick access menu 140-4 that includes a series of pull-down menus, namely a pull-down menu 170 that contains user-selected bookmarks 142 (not shown), a pull down menu 172 that contains recommended bookmarks 160 (not shown), a pull-down menu 174 that contains bookmarks 162 (not shown) to the web pages on the website that were most recently visited by the user, and a pull-down menu 176 that includes bookmarks 164 (not shown) to the most highly ranked web pages.

Additionally, while the embodiments of the quick access menus that are described above with respect to FIGS. 2-6 are each implemented using one or more pull-down menus, it will be appreciated that other implementations are possible. For example, in other embodiments, the various bookmarks 142, 160, 162, 164 that are described above may be displayed in one or more pop-up windows or dialog boxes rather than on one or more pull-down menus. In still other embodiments, the bookmarks 142, 160, 162, 164 may be displayed directly on the web page so that a user need not open a pull-down menu, pop-up window or the like in order to view the bookmarks. Other embodiments are also possible.

Figure 7:
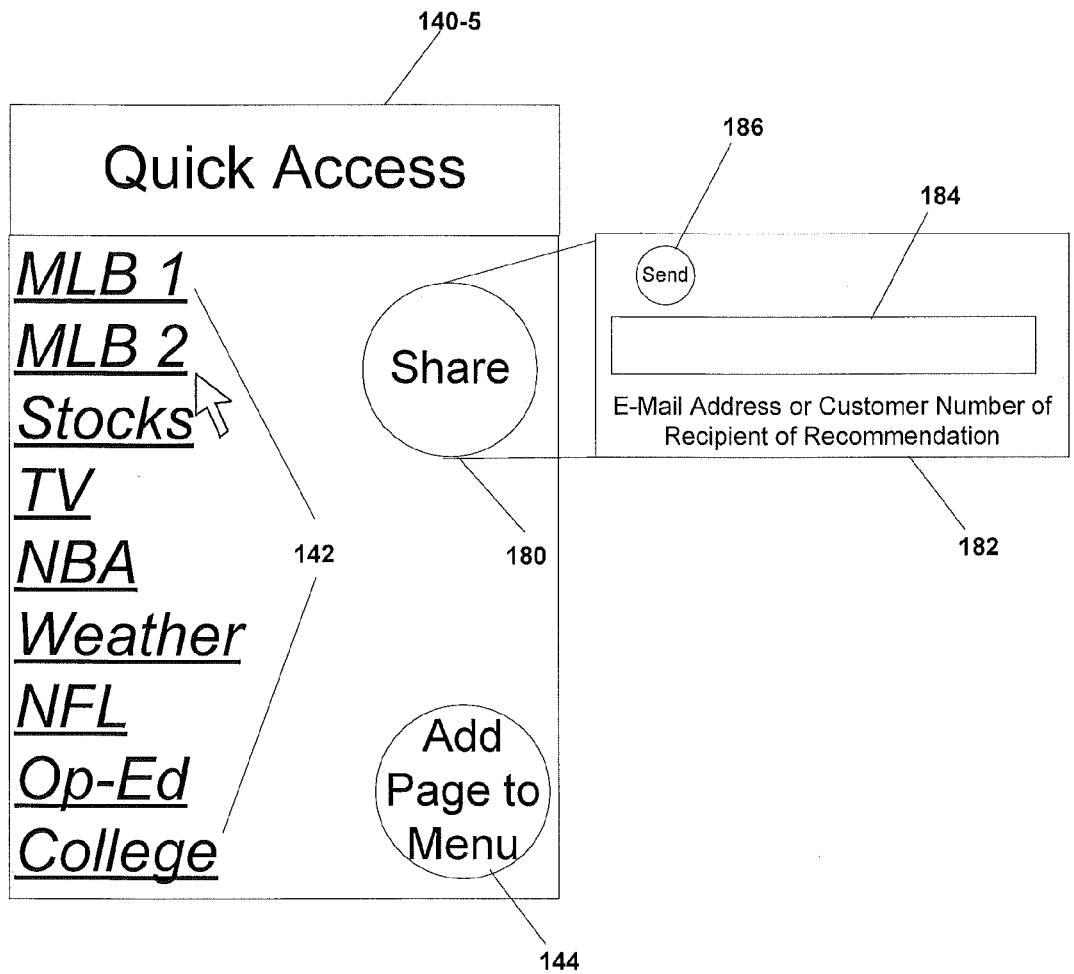
FIG. 7 is a schematic diagram of a quick access menu according to certain embodiments of the present disclosure that includes a sharing widget.

Pursuant to still further embodiments of the present disclosure, quick access menus are provided that include functionality that allows a user to recommend favorite bookmarks to others. For example, as shown in FIG. 7, a quick access menu 140-5 may be provided that includes a share widget. In the example of FIG. 7, the share widget comprises a user-selectable button 180. A user may interact with the button 180 to, for example, generate a dialog box 182. The dialog box 182 in FIG. 7 includes a text block 184. The user may enter identification information (e.g., an e-mail address, cell phone number for SMS text, login name, gamertag, etc.) of another user into the text block 184 to recommend a currently-viewed web page (or alternatively, a selected one of the bookmarks 142) to the other user. The user may then select, for example, a button 186 labeled "Send" to forward to the bookmark service 70 the request to recommend the currently-viewed web page to the user listed in the block 184.

In some embodiments, the bookmark service 70 may use the above-described recommendations to generate "friend recommended" bookmarks 166 that are included on the quick access menu of the user associated with the identification information that is entered into text block 184 in the manner described above. These "friend recommended" bookmarks 166 may be displayed in, for example, a "Friends' Recommendation" area of the quick access menu. The friend-recommended bookmarks 166 may be provided in place of, or in addition to, the recommended bookmarks 160 that are discussed above with respect to FIG. 4. A "friend-recommended" bookmark 166 may be delivered to a user who receives the recommendation for some period of time (e.g., for the first ten web pages that they request after the recommendation is made, for a set period of time such as thirty days, etc.).

In some embodiments, the bookmark service 70 may identify each "friend" that sent a recommended bookmark 166 to a selected user or use other mechanisms to identify the friends of the selected user such as, for example, accessing social media websites to identify a user's friends. The bookmark service 70 may then identify recently-added bookmarks, most popular bookmarks and the like of these "friends" and recommend one or more of these bookmarks as recommended bookmarks 160 to the selected user.

Figure 8:
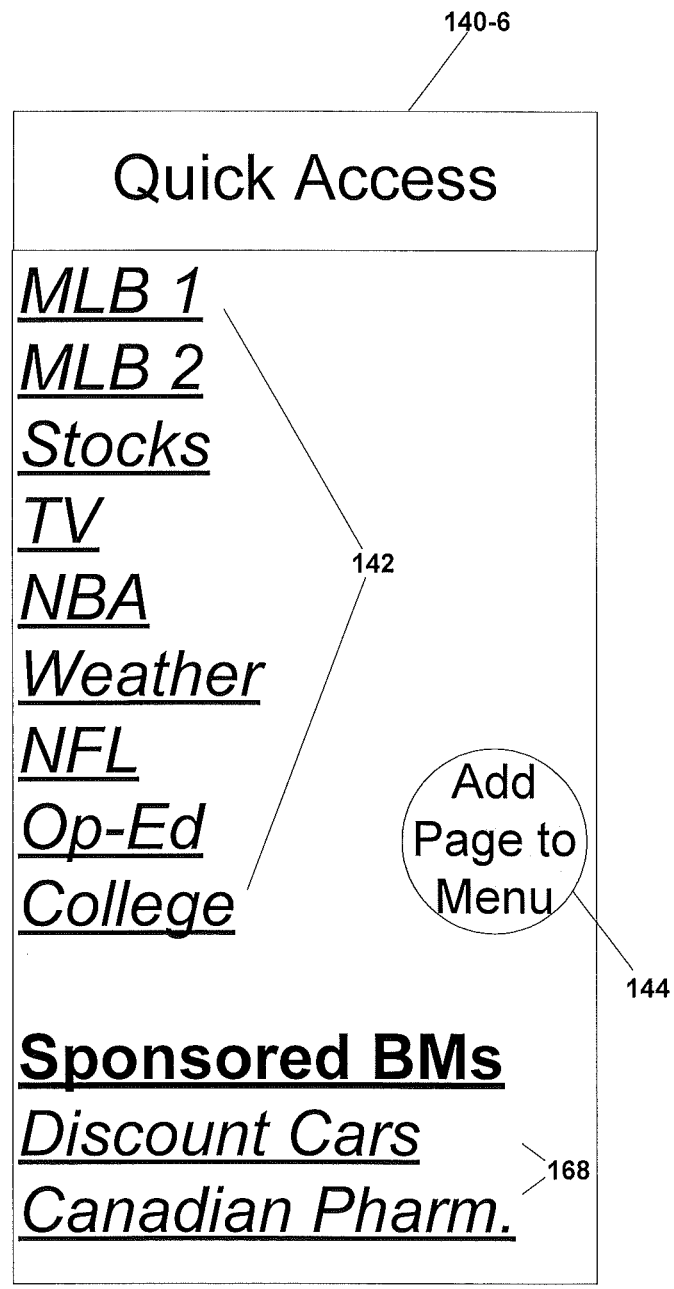
FIG. 8 is a schematic diagram of a quick access menu according to certain embodiments of the present disclosure that includes sponsored bookmarks.

Pursuant to further embodiments of the present disclosure, "sponsored" bookmarks 168 may be included on a user's quick access menu. These sponsored bookmarks 168 may comprise bookmarks to web pages associated with a website of an organization or other entity that has paid a fee to have the bookmarks 168 included on the quick access menu of one or more users of the bookmark service 70. FIG. 8 illustrates an example quick access menu 140-6 that includes such sponsored bookmarks 168. By way of example, the bookmark service 70 may charge an entity a fee to include sponsored bookmarks 168 in the quick access menu 140-6. In the example of FIG. 8, the sponsored bookmarks 168 are placed in a specially designated area. However, it will be appreciated that in other embodiments the sponsored bookmarks 168 instead could be intermixed with, for example, the user-selected bookmarks 142. In some embodiments, each sponsored bookmark 168 may be targeted to users having certain characteristics such as browsing histories, purchasing histories, demographic characteristics, etc.

Pursuant to still further embodiments of the present disclosure, quick access menus may be provided that allow a user to selectively choose the information that is included on the web pages that are delivered in response to the user selecting one or more of the bookmarks 142 on the quick access menu. This additional capability may be provided when, for example, the bookmark service 70 is operated by the host of a website. This additional capability of the bookmark service 70 may be used in an effort to deliver the information that is likely to be of most use to a particular user while not delivering less useful information that may distract the user's attention.

Figure 9:
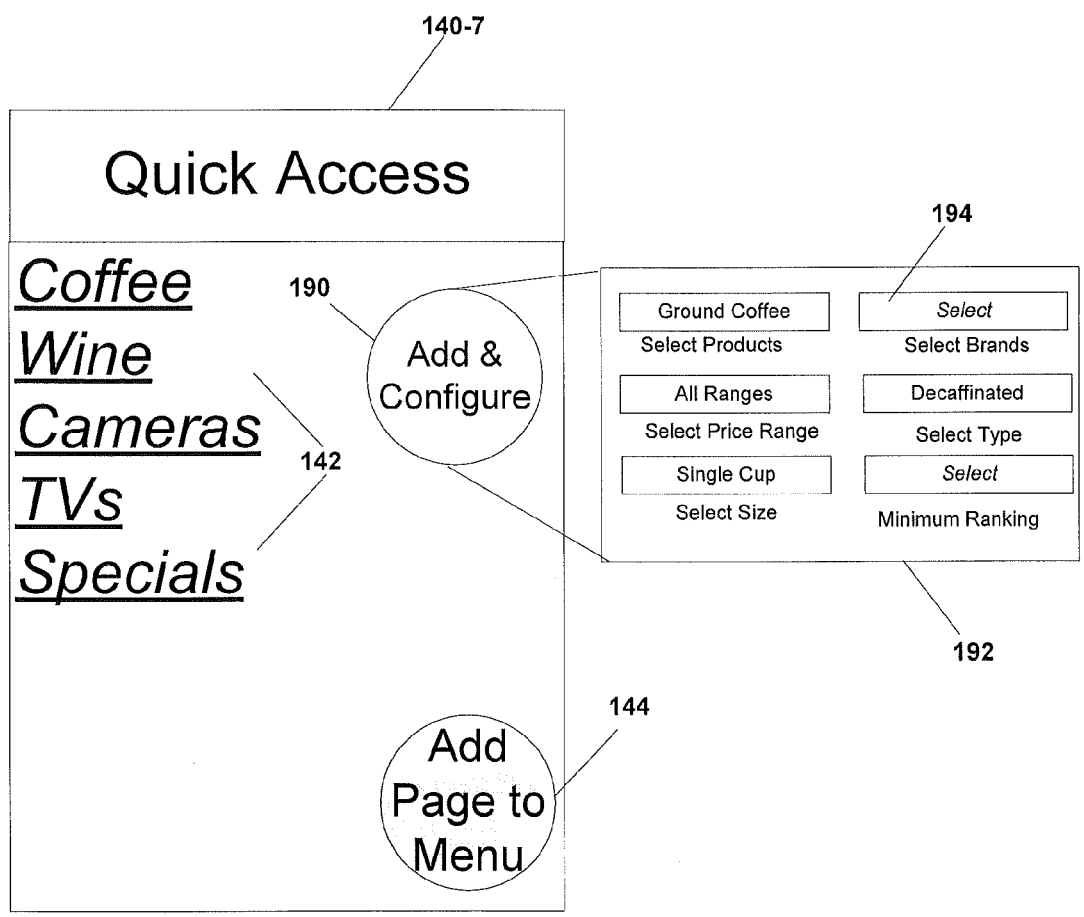
FIG. 9 is a schematic diagram of a quick access menu according to certain embodiments of the present disclosure that allows a user to configure the content provided in a web page that has an associated user-selected bookmark.

The above-described capability to customize certain web pages that are requested by a particular user is illustrated with respect to FIG. 9. In particular, FIG. 9 illustrates a quick access menu 140-7 including a widget that a user may activate by selecting a button 190 labeled "Add & Configure." As shown in FIG. 9, in response to interacting with button 190, a dialog box 192 appears that allows the user to specify filters 194 that will be applied against the web page associated with the bookmark upon rendering the page in response to selection of the bookmark. For example, if the user bookmarked an ecommerce web page containing certain products, the user, while on the web page, could set the filters 194 shown in FIG. 9 to apply to the bookmark associated with the ecommerce page. Thus, upon selection of the ecommerce bookmark, the content on the associated web page would be filtered to display only those products that meet certain user-selected criteria such as a price range, size, type, brand, etc. The web page could likewise be filtered based on other criteria such as a product rankings, minimum number of product reviews and the like. By configuring the content displayed in the web page so that it provides only products of interest to the user, the user's purchasing experience may be enhanced.

Figure 10:
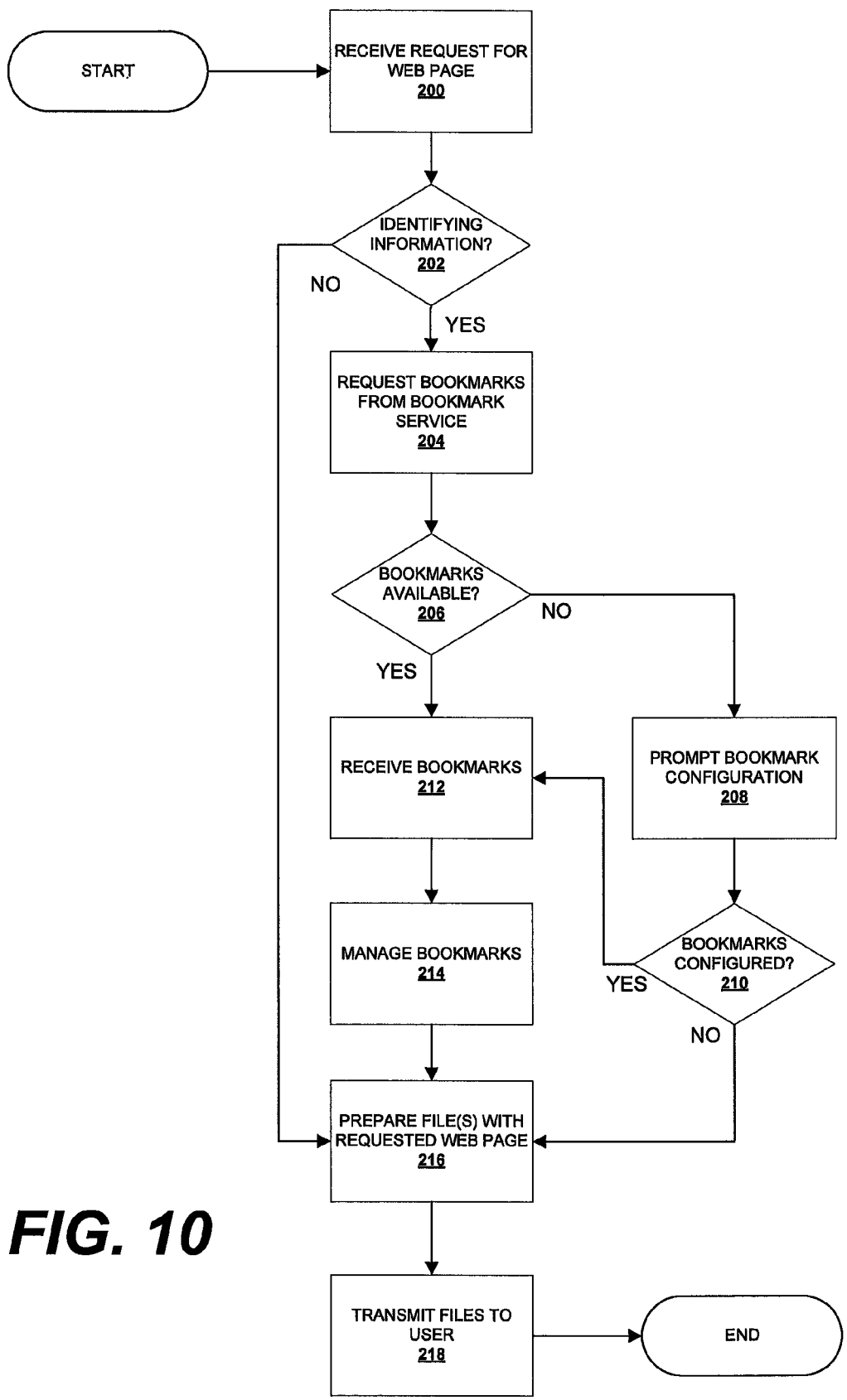
FIG. 10 is a flowchart of operations for providing web pages containing user-selected bookmarks according to certain embodiments of the present disclosure.

FIG. 10 is a flow chart that illustrates operations for providing a user with web pages that include user-selected bookmarks according to certain embodiments of the present disclosure. As shown in FIG. 10, operations may begin by a web server 12 receiving a request to provide a web page (block 200). The request may or may not include information that identifies the user and/or electronic device associated with the request such as login information that is entered by the user or identifying information that is forwarded along with the request by a cookie stored on the requesting electronic device. The web server 12 will determine whether or not such identifying information was forwarded with the request (block 202). If it is not, then the web server 12 provides the requested web page to the requesting electronic device as is known in the art (block 216).

If identifying information is provided, the web server 12 may then make a call to a bookmark service 70 to determine if the user has personalized bookmarks 142 (block 204). The web server 12 may or may not receive bookmarks 142 for the user from the bookmark service 70 in response to this request (block 206). If at block 206 no bookmarks 142 are received from the bookmark service 70, then the web server may optionally prompt the user to select user-selected bookmarks (block 208). The web server 12 may then make a determination as whether or not the user has established one or more user-selected bookmarks (block 210). If the user has not, operations proceed to block 216 where the web server provides the requested web page to the requesting electronic device as is known in the art.

If it is determined at block 206 that bookmarks are available or if it is determined at 210 that the user has established one or more user-selected bookmarks 142, then operations proceed to block 212 where the bookmark service 70 provides the bookmarks 142 for the user at issue to the web server 12. While not shown in FIG. 10, the bookmark service 70 may (or may not) choose to manage the user's bookmarks 142 prior to providing those bookmarks 142 to the web server 12. Such bookmark management may include organizing the bookmarks 142 based on selected criteria (i.e., ordering the bookmarks 142), adding recommended or sponsored bookmarks, or bookmarks to recently visited or highly ranked web pages, etc. Alternatively, the web server 12 may manage the user's bookmark instead of the bookmark service 70 (block 214), or no bookmark management may be performed.

Operations may next proceed to block 216 of FIG. 10, where the web server 12 generates and forwards a response to the request received at block 200. This response may comprise one or more files that include the information that the web browser running on the requesting user's electronic device will need to render the requested web page. As part of this process, the web server 12 may identify hyperlinks and/or any other information that may be required to render the quick access menu as content of the delivered web page. Finally, at block 218, the files containing the information used to generate the requested web page may be transmitted to the electronic device that forwarded the request for the web page. The web browser program that is running on the electronic device may then render the web page including the quick access menu.

Figure 11:
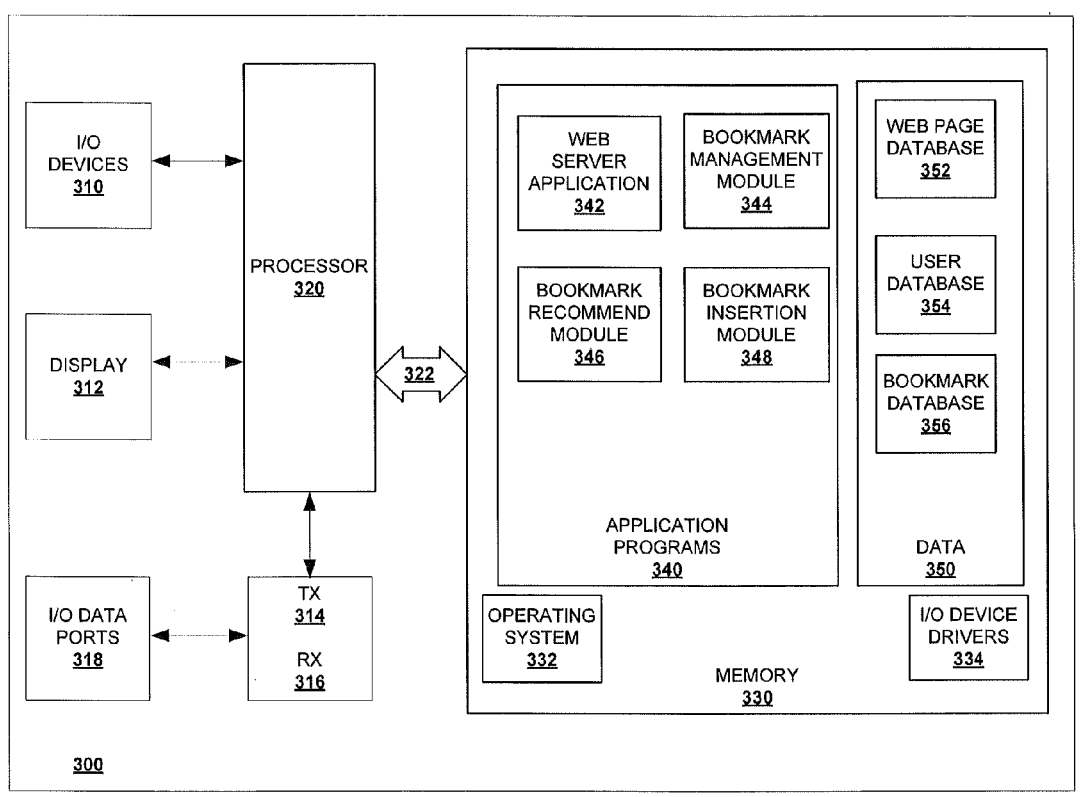

FIG. 11 is a block diagram of a system 300 for providing a user with web pages that include user-selected bookmarks as part of the web page content according to certain embodiments of the present disclosure. While in FIG. 11 the application programs and data are illustrated as being part of a single processing device, it will be appreciated that various of the application programs and data may be located on different devices.

As shown in FIG. 11, the system 300 may include one or more input/output devices 310 (e.g., a keyboard) and a display 312 that may be used to control and operate the system. The system 300 may further include a transmitter 314 and a receiver 316 that may be used to transmit information over a network or other communications connections via one or more input/output ("I/O") data ports 318 and to receive information over the network connections via the I/O data ports 318.

The system 300 further includes a processor 320 that may be connected to the various the components of the device through, for example, a bus or other connection 322. The processor 320 may comprise one or more enterprise, application, personal, pervasive and/or embedded computer systems that may be standalone and/or connected by a wired and/or wireless, real and/or virtual, public and/or private network including the Internet. The processor 320 may be used to run an operating system 332 and application programs 340. The system may also include a memory 330 that stores data and programs that may be used to operate the system 300. The memory 330 may comprise one or more memory devices such as solid state memory devices (such as static, dynamic, volatile and/or non-volatile solid state memory devices) and/or movable memories (such as rotatable magnetic and/or optical memory devices in the form of discs and/or tapes). The operating system 332, input/output device drivers 334, application programs 340 and various data 350 may be stored in this memory system 330.

It will also be appreciated that the hardware and/or software components of the system 300 may each be located in a single location or, alternatively, may be distributed across multiple devices which may be located in multiple locations. For example, the processor 320 may comprise a single processor or, alternatively, may comprise multiple processors that are part of multiple different devices, each of which may run one or more of the application programs 340. The memory 330 may comprise a plurality of networked memory storage devices which are used to store the application programs 340 and other data 350. The memory storage devices may also be in a single location or distributed across multiple locations.

The application programs may include, for example, a web server application 342, a bookmark management module 344, a bookmark recommendation module 346 and a bookmark insertion module 348. The web server application 342 may generate the files that are sent in response to requests for web pages. The bookmark management module 344 may manage a bookmark database 356 by, for example, storing groups of user-selected bookmarks for each user and adding and deleting bookmarks therefrom in response to requests from the users. The bookmark management module 344 may also gather the appropriate bookmarks in response to requests from the bookmark insertion module 348. The bookmark recommendation module 346 may identify non-user identified bookmarks that may be included on a user's quick access menu such as, for example, the recommended bookmarks 160, the bookmarks 162 to recently-visited websites, the bookmarks 164 to highly ranked websites, the friend recommended bookmarks 166 and/or the sponsored bookmarks 168 that are discussed above. The bookmark insertion module 348 may generate the quick access menu-related information that is included in the files that are sent to in response to requests for web pages and provide this information to the web server application 342 so that the quick access menus according to embodiments of the present disclosure may be rendered on the user's display device as part of the requested web page. The data 350 stored in memory 330 may include, for example, a web page database 352, a user database 354 and a bookmark database 356.

While various embodiments have been described above, it will be appreciated that the disclosed embodiments are not intended to be limiting, and are only provided by way of example, and that the present application covers all modifications, equivalents, and alternatives falling within the spirit and scope of the claims appended hereto.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," "including," "have," "having" or variants thereof when used herein, specify the presence of stated features, operations, elements, and/or devices, but do not preclude the presence or addition of one or more other features, operations, elements, devices, and/or groups thereof. Moreover, when an element is referred to as being "responsive" or "connected" to another element or variants thereof, it can be directly responsive or connected to the other element, or intervening elements may be present. In contrast, when an element is referred to as being "directly responsive" or "directly connected" to another element or variants thereof, there are no intervening elements present. As used herein the term "and/or" includes any and all combinations of one or more of the associated listed items.

It will be understood that, although the terms first, second, etc. may be used herein to describe various elements, these terms are only used to distinguish one element from another and are not limiting. For example, a first element could be termed a second element, and, similarly, a second element could be termed a first element without departing from the teachings of the disclosure. Moreover, although some of the diagrams include arrows on communication paths to show a primary direction of communication, it is to be understood that communication may occur in the opposite direction to the depicted arrows.

Various embodiments are described herein with reference to block diagrams and/or flowchart illustrations of computer-implemented methods, apparatus (systems and/or devices) and/or computer program products. It will be understood that a block of the block diagrams and/or flowchart illustrations, and combinations of blocks in the block diagrams and/or flowchart illustrations, can be implemented by computer program instructions that are performed by one or more computer processing devices. These computer program instructions may be provided to a processor circuit of a general purpose computer circuit, special purpose computer circuit, and/or other programmable data processing circuit to produce a machine and/or a computer-implemented process, such that the instructions, which execute via the processor of the computer and/or other programmable data processing apparatus, transform and control transistors, values stored in memory locations, and/or other hardware components within such circuitry to implement the functions/acts specified in the block diagrams and/or flowchart block or blocks, and thereby create means (functionality) and/or structure for implementing the functions/acts specified in the block diagrams and/or flowchart block(s). Accordingly, embodiments according to the present disclosure may be embodied in hardware and/or in software (including firmware, resident software, micro-code, etc.) that runs on a processor such as a digital signal processor, which may collectively be referred to as "circuitry," "a module" or variants thereof.

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

Tangible, non-transitory computer-readable mediums that may be used may include, for example an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-Ray).

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated and/or blocks may be omitted in some circumstances.

Various different embodiments have been disclosed above in connection with the description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A method, comprising:
   receiving, at a first host system, a request from a client for a first web page, wherein the first host system comprises a first processor and a first memory;
   in response to receiving the request, making a call to a bookmarking service, via the first host system, to retrieve a plurality of bookmarks,
      wherein the bookmarking service is hosted on a second host system comprising a second processor and a second memory,
      wherein the plurality of bookmarks are stored by the second host system, and
      wherein individual ones of the plurality of bookmarks link to corresponding ones of a plurality of bookmarked web pages that are part of a single website and the plurality of bookmarks are specific to a corresponding user account, individual ones of the plurality of bookmarked web pages being associated with a category, the category classifying the respective individual ones of the bookmarked web pages as at least one of:
         a highly ranked web page that has been bookmarked by a number of a plurality of users greater than a predefined threshold number, or
         a recommended web page that is recommended by the bookmarking service based at least in part on a browse history associated with a client device;
   in response to receiving the plurality of bookmarks in the first host system from the bookmarking service, requesting each of the plurality of bookmarked web pages via the first host system;
   deleting, via the first host system, a respective bookmark from the plurality of bookmarks in response to receiving a 404 hypertext transfer protocol (HTTP) response code instead of a corresponding bookmarked web page in response to a corresponding request;
   generating, via the first host system, a plurality of thumbnails, each of the plurality of thumbnails being created for a respective one of the bookmarked web pages corresponding to a respective one of the remaining ones of the plurality of bookmarks;
   in response to generating the thumbnail, modifying, via the first host system, the requested first web page to include the remaining ones of the plurality of bookmarks and the plurality of thumbnails, wherein the thumbnail of each of the bookmarked web pages is configured to be rendered in response to a mouse-over event; and
   providing the modified first web page to the client device.

2. The method of claim 1, further comprising filtering, via the first host system, content included in the requested first web page based at least in part on filtering criteria specific to the corresponding user account.

3. The method of claim 1, further comprising ordering the plurality of bookmarks that are included in the requested first web page based at least in part on a number of times that the corresponding user account has previously been associated with an access to individual ones of the plurality of bookmarked web pages associated with the plurality of bookmarks.

4. The method of claim 1, wherein the single website includes the requested first web page.

5. The method of claim 1, further comprising automatically updating a first Uniform Resource Locator (URL) associated with a first one of the plurality of bookmarks in response to determining that a second URL of a bookmarked web page corresponding to the first one of the plurality of bookmarks has changed.

6. The method of claim 1, wherein the category further classifies the respective individual ones of the bookmarked web pages as a sponsored web page, wherein the sponsored web page is sponsored based at least in part on at least one of the plurality of bookmarks created in association with the corresponding user account.

7. A non-transitory computer-readable medium comprising a program that, when executed by a first host system comprising a first processor and a first memory, causes the first host system to at least:
   receive a request from a client for a first web page;
   in response to receipt of the request, retrieve a plurality of bookmarks from a bookmarking service, wherein the bookmarking service is hosted on a second host system comprising a second processor and a second memory, wherein the plurality of bookmarks are stored by the second host system, and wherein individual ones of the plurality of bookmarks link to corresponding ones of a plurality of bookmarked web pages that are part of a single website and the plurality of bookmarks are specific to a corresponding user account, individual ones of the plurality of bookmarked web pages being associated with a category, the category classifying the respective individual ones of the bookmarked web pages as at least one of:

a highly ranked web page that has been bookmarked by a number of a plurality of users greater than a predefined threshold number, or a recommended web page that is recommended by the bookmarking service based at least in part on a browse history associated with a client device;

in response to receipt of the plurality of bookmarks from the bookmarking service, request individual ones of the plurality of bookmarked web pages;

delete a respective bookmark from the plurality of bookmarks in response to receipt of a 404 hypertext transfer protocol (HTTP) response code instead of a corresponding bookmarked web page in response to a corresponding request;

generate a plurality of thumbnails, individual ones of the plurality of thumbnails being created for a respective one of the bookmarked web pages corresponding to a respective one of the remaining ones of the plurality of bookmarks;

in response to generation of the plurality of thumbnails, modify the requested first web page to include the remaining ones of the plurality of bookmarks and the plurality of thumbnails, wherein a thumbnail for individual ones of the bookmarked web pages is configured to be rendered in response to a mouse-over event; and provide the modified first web page to the client device.

8. The non-transitory computer-readable medium of claim 7, wherein the program further causes the first host system to at least filter content included in the requested first web page based at least in part on filtering criteria specific to the corresponding user account.

9. The non-transitory computer-readable medium of claim 7, wherein the program further causes the first host system to at least order the plurality of bookmarks that are included in the requested first web page based at least in part on a number of times that the corresponding user account has previously been associated with an access to individual ones of the plurality of bookmarked web pages associated with the plurality of bookmarks.

10. The non-transitory computer-readable medium of claim 7, wherein the single website includes the requested first web page.

11. The non-transitory computer-readable medium of claim 7, wherein the program further causes the first host system to at least update a first Uniform Resource Locator (URL) associated with a first one of the plurality of bookmarks in response to a determination that a second URL of a bookmarked web page corresponding to the first one of the plurality of bookmarks has changed.

12. The non-transitory computer-readable medium of claim 7, wherein the category further classifies the respective individual ones of the bookmarked web pages as a sponsored web page.

13. The non-transitory computer-readable medium of claim 12, wherein the sponsored web page is sponsored based at least in part on at least one of the plurality of bookmarks created in association with the corresponding user account.

14. A system, comprising:

a first host system comprising a first processor and a first memory; and an application stored in the first memory comprising a plurality of instructions, wherein the plurality of instructions, when executed by the first processor, cause the first host system to at least:

receive a request from a client for a first web page;

in response to receipt of the request, retrieve a plurality of bookmarks from a bookmarking service, wherein the bookmarking service is hosted on a second host system comprising a second processor and a second memory, wherein the plurality of bookmarks are stored by the second host system, and wherein individual ones of the plurality of bookmarks link to corresponding ones of a plurality of bookmarked web pages that are part of a single website and the plurality of bookmarks are specific to a corresponding user account, individual ones of the plurality of bookmarked web pages being associated with a category, the category classifying the respective individual ones of the bookmarked web pages as at least one of:

a highly ranked web page that has been bookmarked by a number of a plurality of users greater than a predefined threshold number, or a recommended web page that is recommended by the bookmarking service based at least in part on a browse history associated with a client device;

in response to receipt of the plurality of bookmarks from the bookmarking service, request individual ones of the plurality of bookmarked web pages;

delete a respective bookmark from the plurality of bookmarks in response to receipt of a 404 hypertext transfer protocol (HTTP) response code instead of a corresponding bookmarked web page in response to a corresponding request;

generate a plurality of thumbnails, individual ones of the plurality of thumbnails being created for a respective one of the bookmarked web pages corresponding to a respective one of the remaining ones of the plurality of bookmarks;

in response to generation of the plurality of thumbnails, modify the requested first web page to include the remaining ones of the plurality of bookmarks and the plurality of thumbnails, wherein a thumbnail for individual ones of the bookmarked web pages is configured to be rendered in response to a mouse-over event; and provide the modified first web page to the client device.

15. The system of claim 14, wherein the plurality of instructions, when executed by the first processor, further cause the first host system to at least filter content included in the requested first web page based at least in part on filtering criteria specific to the corresponding user account.

16. The system of claim 14, wherein the plurality of instructions, when executed by the first processor, further cause the first host system to at least order the plurality of bookmarks that are included in the requested first web page based at least in part on a number of times that the corresponding user account has previously been associated with an access to individual ones of the plurality of bookmarked web pages associated with the plurality of bookmarks.

17. The system of claim 14, wherein the single website includes the requested first web page.

18. The system of claim 14, wherein the plurality of instructions, when executed by the first processor, further cause the first host system to at least update a first Uniform Resource Locator (URL) associated with a first one of the plurality of bookmarks in response to a determination that a second URL of a bookmarked web page corresponding to the first one of the plurality of bookmarks has changed.

19. The system of claim 14, wherein the category further classifies the respective individual ones of the bookmarked web pages as a sponsored web page, wherein the sponsored web page is sponsored based at least in part on at least one of the plurality of bookmarks created in association with the corresponding user account.

20. The system of claim 19, wherein the sponsored web page is sponsored based at least in part on at least one of the plurality of bookmarks created in association with the corresponding user account.

\* \* \* \* \*